(12) United States Patent
Xiong et al.

(10) Patent No.: US 11,044,059 B2
(45) Date of Patent: Jun. 22, 2021

(54) DYNAMIC RESOURCE ALLOCATIONS AND TRANSMISSION SCHEMES FOR XPUCCH (5G PUCCH)

(71) Applicant: APPLE INC., Cupertino, CA (US)

(72) Inventors: Gang Xiong, Beaverton, OR (US); Hong He, Sunnyvale, CA (US); Ralf Bendlin, Portland, OR (US); Ajit Nimbalker, Fremont, CA (US); Jong-Kae Fwu, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/809,985

(22) Filed: Mar. 5, 2020

(65) Prior Publication Data

US 2020/0351043 A1 Nov. 5, 2020

Related U.S. Application Data

(63) Continuation of application No. 16/067,677, filed as application No. PCT/US2016/040498 on Jun. 30, 2016, now Pat. No. 10,623,153.

(60) Provisional application No. 62/290,791, filed on Feb. 3, 2016.

(51) Int. Cl.
*H04W 4/00* (2018.01)
*H04L 5/00* (2006.01)
*H04L 27/26* (2006.01)
*H04W 72/04* (2009.01)

(52) U.S. Cl.
CPC .......... *H04L 5/0044* (2013.01); *H04L 5/0037* (2013.01); *H04L 5/0042* (2013.01); *H04L 5/0055* (2013.01); *H04L 5/0057* (2013.01); *H04L 5/0069* (2013.01); *H04L 27/2607* (2013.01); *H04L 27/2627* (2013.01); *H04L 27/2649* (2013.01); *H04W 72/0413* (2013.01); *H04L 5/008* (2013.01); *H04L 5/0085* (2013.01); *H04L 5/0094* (2013.01)

(58) Field of Classification Search
CPC .. H04W 72/14; H04W 72/1284; H04W 28/04
See application file for complete search history.

(56) References Cited

U.S. PATENT DOCUMENTS

2013/0301545 A1  11/2013  Wang et al.

FOREIGN PATENT DOCUMENTS

EP       2216915 A1    8/2010

OTHER PUBLICATIONS

U.S. Appl. No. 16/067,677, Non-Final Office Action, dated Aug. 9, 2019, 7 pages.
U.S. Appl. No. 16/067,677, Notice of Allowance, dated Dec. 12, 2020, 7 pages.
Alcatel-Lucent, Alcatel-Lucent Shanghai Bell, "New PUCCH format design for supporting CA with up to 32 CCs", R1-154594, 3GPP TSG-RAN WG1 Meeting #82, Beijing, China, Agenda Item 7.2.2.1.1, Aug. 24-25, 2015, 4 pages.

(Continued)

*Primary Examiner* — Bo Hui A Zhu

(57) ABSTRACT

Disclosed are embodiments related to implementing a dynamic resource allocation and transmission scheme for a fifth generation (5G) physical uplink control channel (xPUCCH) in a 5G system. In particular, embodiments include mechanisms to dynamically allocate resources for the transmission of xPUCCH, and resource mapping schemes for 5G systems supporting more than one symbol allocated for an xPUCCH transmission.

18 Claims, 12 Drawing Sheets

(56) References Cited

OTHER PUBLICATIONS

Ericsson, "5G-Key Component of the Networked Society", RWS-150009, 3GPP TAN Workshop on 5G, Phoenix, Arizona, USA, Sep. 17-18, 2015, 55 pages.
PCT/US2016/040498, International Search Report and Written Opinion, dated Aug. 24, 2016, 15 pages.
QUALCOMM, "5G Views on Technology and Standardization", RWS-150012, 3GPP RAN Workshop on 5G, Phoenix, Arizona, USA, Sep. 2015, 21 pages.

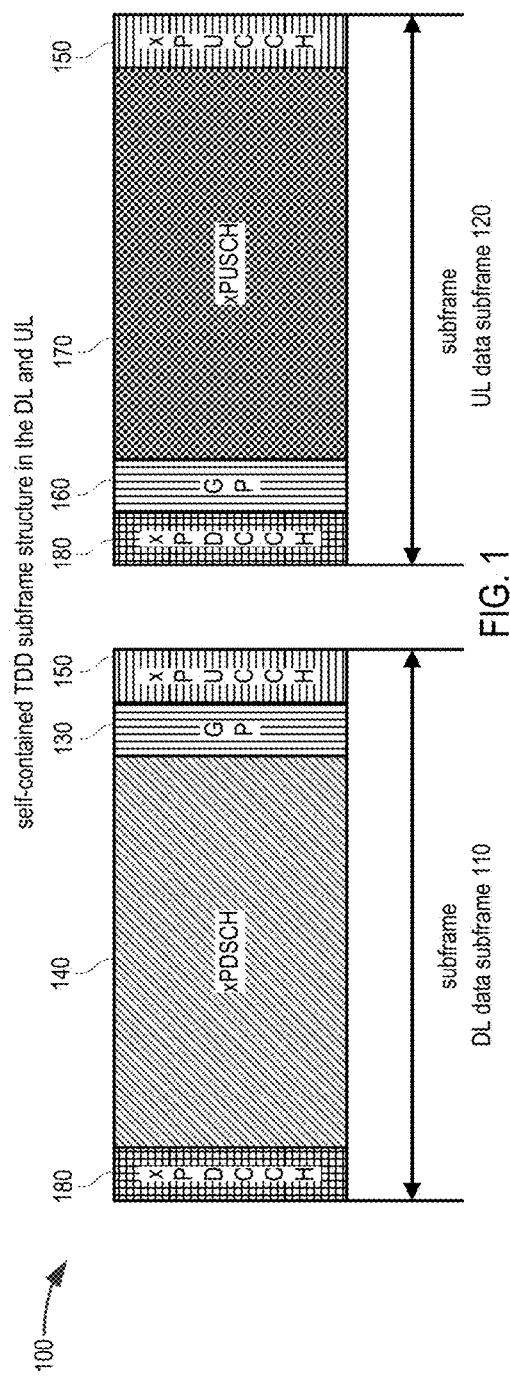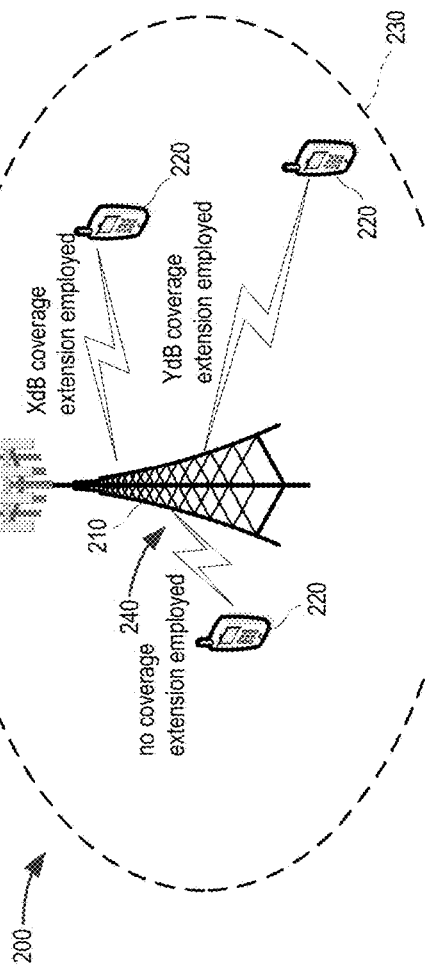
FIG. 1
FIG. 2 various coverage extension levels for xPUCCH in a DL data subframe 300 normal coverage, e.g., 1 symbol for xPUCCH 310 coverage extension level #1, e.g., 3 symbols for xPUCCH 320 coverage extension level #2, e.g., 5 symbols for xPUCCH 330 various coverage extension levels for
xPUCCH in a UL data subframe
400 normal coverage, e.g.,
1 symbol for xPUCCH
410 coverage extension level #1, e.g.,
3 symbols for xPUCCH
420 coverage extension level #2, e.g.,
5 symbols for xPUCCH
430 coverage extension level (e.g., level #2) for
xPUCCH in a UL data subframe
500 coverage extension level #2, e.g.,
xPUCCH is FDM with xPUSCH
530

DYNAMIC RESOURCE ALLOCATIONS AND TRANSMISSION SCHEMES FOR XPUCCH (5G PUCCH)

RELATED APPLICATIONS

This application is a continuation of U.S. patent application Ser. No. 16/067,677, filed Jul. 2, 2018, now U.S. Pat. No. 10,623,153 issued Apr. 14, 2020, which is a national stage filing under U.S.C. § 371 of International Patent Application No. PCT/US2016/040498, filed Jun. 30, 2016, which claims benefit of U.S. Provisional Patent Application No. 62/290,791, filed Feb. 3, 2016, each of which is hereby incorporated by reference herein in its entirety.

TECHNICAL FIELD

This disclosure relates generally to the field of wireless communications and, more particularly, to fifth generation (5G) radio access technology (RAT) and associated air interfaces in connection with resource allocation for a 5G physical uplink control channel (xPUCCH).

BACKGROUND INFORMATION

Mobile communication has evolved significantly from early voice systems to today's highly sophisticated integrated communication platform. The next generation wireless communication system, 5G, will evolve based on 3rd Generation Partnership Project (3GPP) Long Term Evolution (LTE)-Advanced standards, with additional potential new RATs to enrich lives with improved, simple, and seamless wireless connectivity solutions. 5G will enable everything to be connected by wireless and deliver fast and rich content and services, as it is expected to provide access to information and sharing of data anywhere and anytime by various users and applications. 5G is also expected to be a unified network and system targeted to meet vastly different—and sometimes conflicting—performance dimensions and services. Such diverse, multi-dimensional goals are driven by different services and applications.

BRIEF DESCRIPTION OF THE DRAWINGS

FIG. 1 is a pair of block diagrams showing a self-contained time-division duplex (TDD) subframe structure in a downlink (DL) and an uplink (UL) data subframe.

FIG. 2 is a block diagram showing an example of various coverage extension levels.

Figure 3:
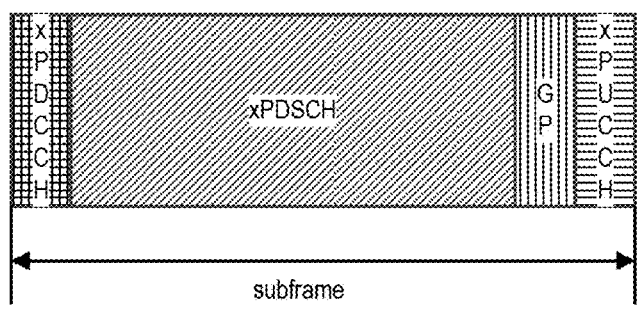
FIG. 3 is a block diagram showing an example of various coverage extension levels for an xPUCCH in the DL data subframe.
Figure 3:
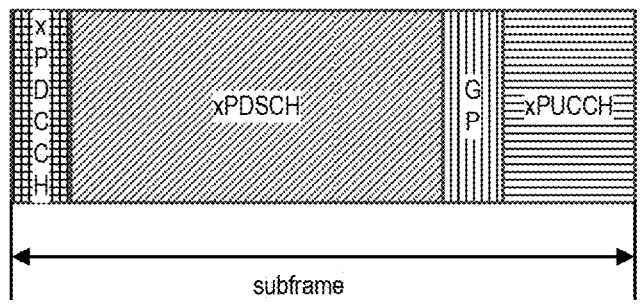
Figure 3:
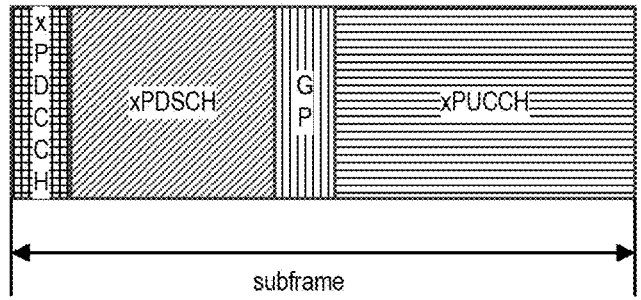

Aspects and advantages will be apparent from the following detailed description of embodiments, which proceeds with reference to the accompanying drawings.

DETAILED DESCRIPTION OF EMBODIMENTS

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Introduction

To enable low latency transmission for enhanced mobile broadband communication, self-contained TDD subframe structure can be introduced in a 5G system. Each subframe is self-contained because it encompasses both communication (e.g., downlink) and feedback (e.g., uplink) periods at different times in the subframe. In other words, data is transmitted in one portion of a subframe, and feedback, such as an acknowledgement (ACK) or negative ACK (NACK) feedback, is provided during another portion of the same subframe. Also, although each subframe includes uplink and downlink periods, subframes are also referred to as UL or DL subframes because DL (data) subframes include physical resources for transmission of DL data from an eNB to a UE and UL (data) subframes include physical resources for transmission of UL data from a UE to an eNB.

FIG. 1 illustrates examples of a self-contained TDD subframe structure 100 for both a DL data subframe 110 and a UL data subframe 120. To accommodate switching time between DL/UL transitions in each subframe and provide for round-trip propagation delay, a guard period (GP) 130 is inserted between a 5G physical downlink shared channel (xPDSCH) 140 (e.g., a channel for DL data) and an xPUCCH 150. Likewise, in the UL data subframe 120, a guard period 160 is adjacent the data channel—a 5G physical uplink shared channel (xPUSCH) 170—and a 5G physical downlink control channel (xPDCCH) 180.

FIG. 1 also shows that the xPUCCH 150 accompanies both DL and UL data channels, as it is typically used to carry UCI, which may comprise, e.g., hybrid automatic request (HARQ) ACK/NACK bits, channel state information (CSI) feedback, beam reference signal (BRS) reports, or other feedback. For example, in a DL scenario, the xPUCCH 150 follows the xPDSCH 140 and provides feedback on the downlink, i.e., HARQ (ACK/NACK) bits. And in the UL scenario, the xPUCCH 150 follows the xPUSCH and provides CSI, scheduling request (SR), buffered HARQ ACK/NACK associated with previous subframes, or other feedback.

In both UL and DL, the xPUCCH 150 and data are multiplexed in the subframe according to a time-division multiplexing (TDM) scheme. In the case when one symbol is allocated for xPUCCH, increasing the number of resources in the frequency domain for xPUCCH transmission may not improve the link budget accordingly. This is primarily due to the fact that when more resources are allocated for xPUCCH, the coding rate is reduced at the cost of increased noise power. With the same transmit power, the maximum coupling loss (MCL) between UE and eNB, and thus the link budget for xPUCCH transmission remains the same.

FIG. 2 illustrates a 5G system 200 including an eNB 210 and UEs, showing examples of various coverage extension levels that the UEs 220 may employ. For the 5G system 200, some UEs may be located at a cell edge 230. In this case, coverage enhancement with certain extension levels may be used to allow such UEs to communicate with the eNB 210 without service interruption. On the contrary, some UEs may be located near a cell center 240, such that those UEs may not benefit from coverage extension.

To improve link budget, more orthogonal frequency-division multiplexing (OFDM), i.e., time domain, symbols may be allocated for xPUCCH transmissions. And given that different UEs may desire different coverage extension levels (as shown in FIG. 2), different numbers of OFDM symbols may be allocated for xPUCCH transmission in order to address the aforementioned xPUCCH coverage issue under different coverage extension situations. Accordingly, mechanisms to allocate a different number of OFDM symbols for xPUCCH transmission are contemplated. Also described are techniques for indicating a number of OFDM symbols, and for defining a resource mapping by which to derive xPUCCH resources deployed across multiple OFDM symbols.

Dynamic Resource Allocation for xPUCCH Transmission

FIG. 3 illustrates examples 300 of achieving varied coverage extension levels for xPUCCH transmission in a subframe containing downlink data (e.g., xPDSCH) by supporting a different number of OFDM symbols in time for xPUCCH transmission. For example, one OFDM symbol may be allocated for xPUCCH transmission in a case of first coverage level (e.g., normal coverage) 310. Three symbols may be allocated for the xPUCCH transmission in the case of a second coverage level (e.g., coverage extension level #1) 320. Five symbols may be allocated for the xPUCCH transmission in the case of a third coverage level (e.g., coverage extension level #2) 330. Note that other values for the number of OFDM symbols or coverage extension levels may be readily derived from these examples.

Figure 4:
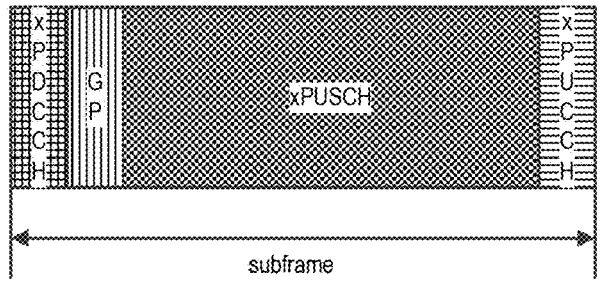
FIG. 4 is a block diagram showing an example of various coverage extension levels for an xPUCCH in the UL data subframe.
Figure 4:
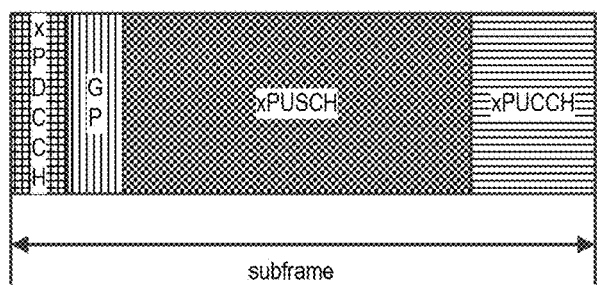
Figure 4:
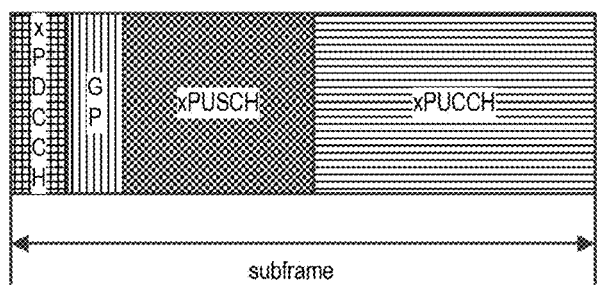

FIG. 4 illustrates examples 400 of various coverage extension levels for xPUCCH transmission in subframes that can contain UL data (e.g., xPUSCH). Similar to the subframes 300 containing downlink data (e.g., xPDSCH), a different number of OFDM symbols may be allocated for xPUCCH transmission to support different coverage extension levels 410, 420, and 430.

Figure 5:
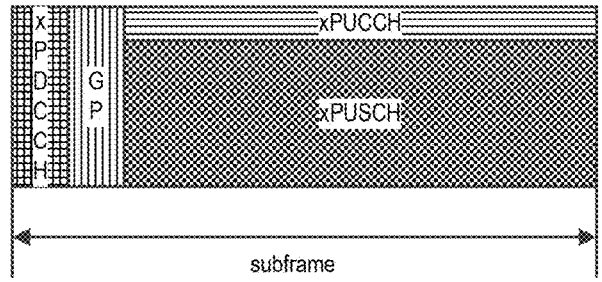
FIG. 5 is a block diagram showing, for a coverage extension level #2, an example of a frequency-division multiplexing (FDM) option of an xPUCCH in the UL data subframe.

FIG. 5 illustrates another example 500 of a coverage level for xPUCCH transmission in the UL data subframe. In this example 500, the multiplexing scheme between xPUCCH and xPUSCH may be determined based on the intended coverage extension level of the xPUCCH. For a smaller coverage extension level, e.g., normal coverage or level #1, xPUCCH may be time-division multiplexed with xPUSCH as shown in 410 and 420 of FIG. 4. However, for a larger coverage extension level, e.g., level #2, xPUCCH and xPUSCH are multiplexed in a frequency-division multiplexing (FDM) manner 530.

Note that in certain cases, the xPUCCH may be transmitted by a first UE, while the xPUSCH may be transmitted by a second UE. In this case, the number of symbols allocated for xPUCCH transmission can be the same as that for xPUSCH transmission. Although not shown in FIG. 5, a wider group of frequency resources may also be allocated for xPUCCH transmission to further improve the link budget. Further, for coverage extension level #2, the entire last symbol may be allocated for xPUCCH transmission. In another subframe structure, the xPUCCH and xPUSCH may combine TDM and FDM in order to improve the spectrum efficiency but still provide the desired xPUCCH coverage level.

Figure 6:
FIG. 6 is a block diagram showing an example of various coverage extension levels with separate encoding of different uplink control information (UCI) types.

The xPUCCH can be used to carry a single UCI type or several different UCI types. FIG. 6 depicts examples 600 of the latter scenario. In a given subframe, different UCI types can be transmitted on separate xPUCCH resources or they can be jointly coded and transmitted on a single xPUCCH resource. For example, a first UCI type, such as HARQ ACK/NACK (or a first set of different UCI types), could be transmitted on a last OFDM symbol of a subframe 610 or 620, whereas a second UCI type, such as CSI feedback (or a second set of different UCI types), could be transmitted on a second to last OFDM symbol. In another example, HARQ ACK/NACK could be transmitted on the last OFDM symbol and CSI feedback as well as BRS reports could be transmitted on the second to last OFDM symbol.

Note that several xPUCCH resources carrying different UCI types in the same subframe can have the same number of resources (e.g., subframes 630, 640, and 650) or have a different number of resources (e.g., due to different UCI payloads, subframes 660, 670, and 680). In addition, multiple xPUCCH resources carrying different UCI types in the same subframe may either have the same multiplexing scheme with other channels (e.g., both are TDM with the data region, subframes 610, 620, 630, 640, 660, and 680; or both are FDM with the data region, subframe 650) or follow different multiplexing schemes with other channels (e.g., subframe 670). For example in the subframe 670, xPUCCH carrying a first UCI type (or a first set of different UCI) could be transmitted in a time-division multiplexing manner, whereas xPUCCH carrying a second UCI type (or a second set of different UCI) could be transmitted in a frequency-division multiplexing manner.

Configuration of Resources for the xPUCCH Transmission

In one embodiment, the number of symbols allocated (or configured) for the transmission of xPUCCH may be predefined in a system specification, defined as a function of the system bandwidth, or based on a higher-layer configuration message. For the latter case, with larger system bandwidth, more symbols can be allocated for xPUCCH transmission.

Figure 7:
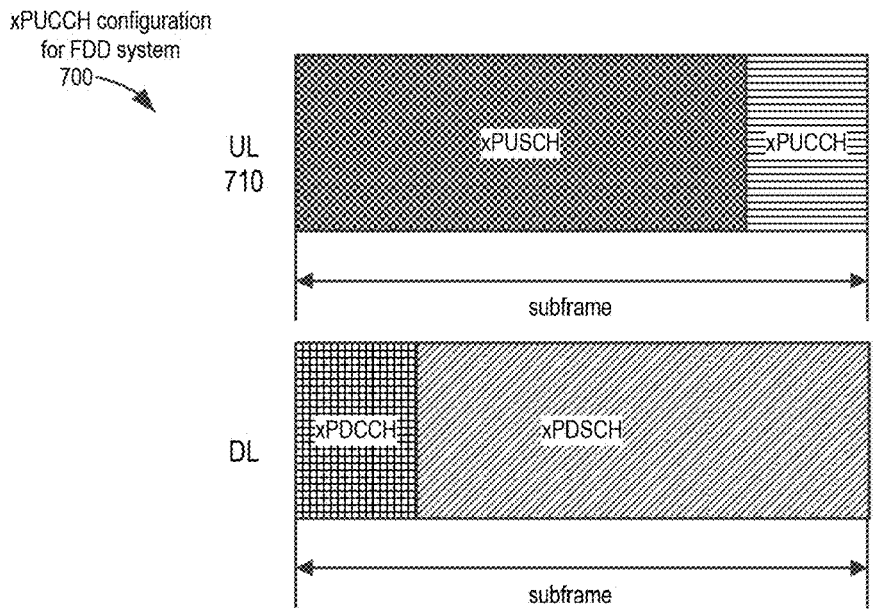
FIG. 7 is a block diagram of an xPUCCH configuration for a frequency-division duplex (FDD) system.

In another embodiment, the number of symbols allocated (or configured) for the transmission of xPUCCH can be configured via 5G master information block (xMIB), 5G system information block (xSIB) or radio resource control (RRC) signaling. Note that this option may be appropriate for the UEs in a stationary condition given that the coverage condition may remain the same for a long period of time. Further, this option may also be suitable for an FDD system 700, as illustrated in FIG. 7. For example, in a UL component carrier 710, a number of OFDM symbols used for xPUCCH transmission can be configured by higher layers such as RRC or media access control (MAC).

In another embodiment, the number of symbols allocated (or configured) for the transmission of xPUCCH can be dynamically indicated in a downlink control information (DCI) via xPDCCH. To reduce signaling overhead, a set for the number of xPUCCH symbols can be predefined in a system specification or configured by higher layers via 5G master information block (xMIB), 5G system information block (xSIB) or RRC signaling. Further, a field in the DCI format can be used to indicate the configuration (e.g., number of symbols) used for xPUCCH transmission.

In yet another embodiment, the number of symbols for xPUCCH transmission may be implicitly signaled through a control channel aggregation level of an associated xPDCCH transmission. The control channel aggregation level is defined as a number of control channel elements (CCEs) used for xPDCCH transmission. A CCE is a group of resource elements (e.g., 36 REs).

In one example, four control channel aggregation levels are supported for xPDCCH transmission. An eNB may transmit xPDCCH using a first aggregation level (e.g., 1) to inform a UE to transmit xPUCCH using a first configuration (e.g., a one-symbol xPUCCH). But the eNB may also transmit xPDCCH using a second aggregation level (e.g., 2), and thereby informs a UE to transmit xPUCCH using a second configuration (e.g., a two-symbol xPUCCH).

Table 1 illustrates one example of indicating the number of xPUCCH symbols using the DCI. More specifically, the xPUCCH resource allocation field in the DCI can be used to dynamically indicate one from the four candidate numbers of xPUCCH symbols (e.g., Table 1), which may also be configured by higher layers according to a mapping defined in higher layers (e.g., RRC signaling, Table 2). A single bit value is also possible, in which its two possible values represent either a 1-symbol xPUCCH or a full subframe xPUCCH.

TABLE 1

Predefined Number of xPUCCH Symbols

| Bit field in DCI for xPUCCH resource allocation | Number of symbols allocated for xPUCCH transmission |
| --- | --- |
| '00' | 1 |
| '01' | 3 |
| '10' | 5 |
| '11' | 7 |

TABLE 2

Configurable Number of xPUCCH Symbols

| Bit field in DCI for xPUCCH resource allocation | Number of symbols allocated for xPUCCH transmission |
| --- | --- |
| '00' | First value configured by higher layers |
| '01' | Second value configured by higher layers |
| '10' | Third value configured by higher layers |
| '11' | Fourth value configured by higher layers |

Note that the configuration for the number of symbols allocated for the transmission of xPUCCH may be different for DL and UL subframes. For instance, {1, 3, 5, 7} may be configured for xPUCCH transmission for a DL data subframe while {1, 3, 5, 12} may be configured for xPUCCH transmission for a UL data subframe.

In another embodiment, the number of symbols allocated for the transmission of xPUCCH can be indicated in a dedicated control channel. In one option, a physical control format indicator channel (PCFICH) as defined in the LTE specification can be repurposed (e.g., xPCFICH) to indicate the number of symbols allocated for the transmission of xPUCCH. Note that in this option, up to two bits can be conveyed by xPCFICH.

In another option, a physical TDD configuration indicator channel (PTCICH) can be applied to indicate the number of symbols allocated for the transmission of xPUCCH.

Further, in the DL subframe, in order to avoid the collision between xPDSCH and xPUCCH from different UEs, duration of xPDSCH transmission, or the number of OFDM symbols allocated for xPDSCH transmission may be semi-statically configured via xMIB, xSIB or RRC signaling or dynamically indicated in the DCI format carrying a downlink assignment. Similar to Table 1, a limited set for the number of xPDSCH symbols can be predefined in a specification or configured by higher layers via xMIB, xSIB or RRC signaling.

Similarly, in the UL subframe, the number of OFDM symbols allocated for xPUSCH transmission may be semi-statically configured via xMIB, xSIB or RRC signaling or dynamically indicated in the DCI format carrying an uplink grant.

Resource Mapping Rules to Derive xPUCCH Resources

Various options can be used to configure the xPUCCH resource. In particular, it can be configured semi-statically by high layers or can be indicated in the one field in the DCI format carrying a DL assignment. In the latter case, the bit field, or ACK/NACK resource indicator (ARI), can be used for UE to determine the xPUCCH resource value from one of four xPUCCH resource values configured by higher layers.

To avoid the collision on the xPUCCH transmission between multiple UEs, multiple resources configured for the xPUCCH transmission are derived from a resource that is the initial or final (e.g., pre-configured) OFDM symbol located within the xPUCCH region. In other words, in the case when more than one symbol is allocated for xPUCCH for coverage enhancement, the resources allocated for the xPUCCH transmission in symbols other than a so-called "bookend" symbol are derived from the resource configured as that bookend symbol. Further, a rule, function, or equation that maps resources based on the bookend resource may be common to each UE (determined in a cell-specific manner) to avoid collisions. In other words, UEs follow the same resource mapping rule when transmitting the xPUCCH in the uplink.

Figure 8:
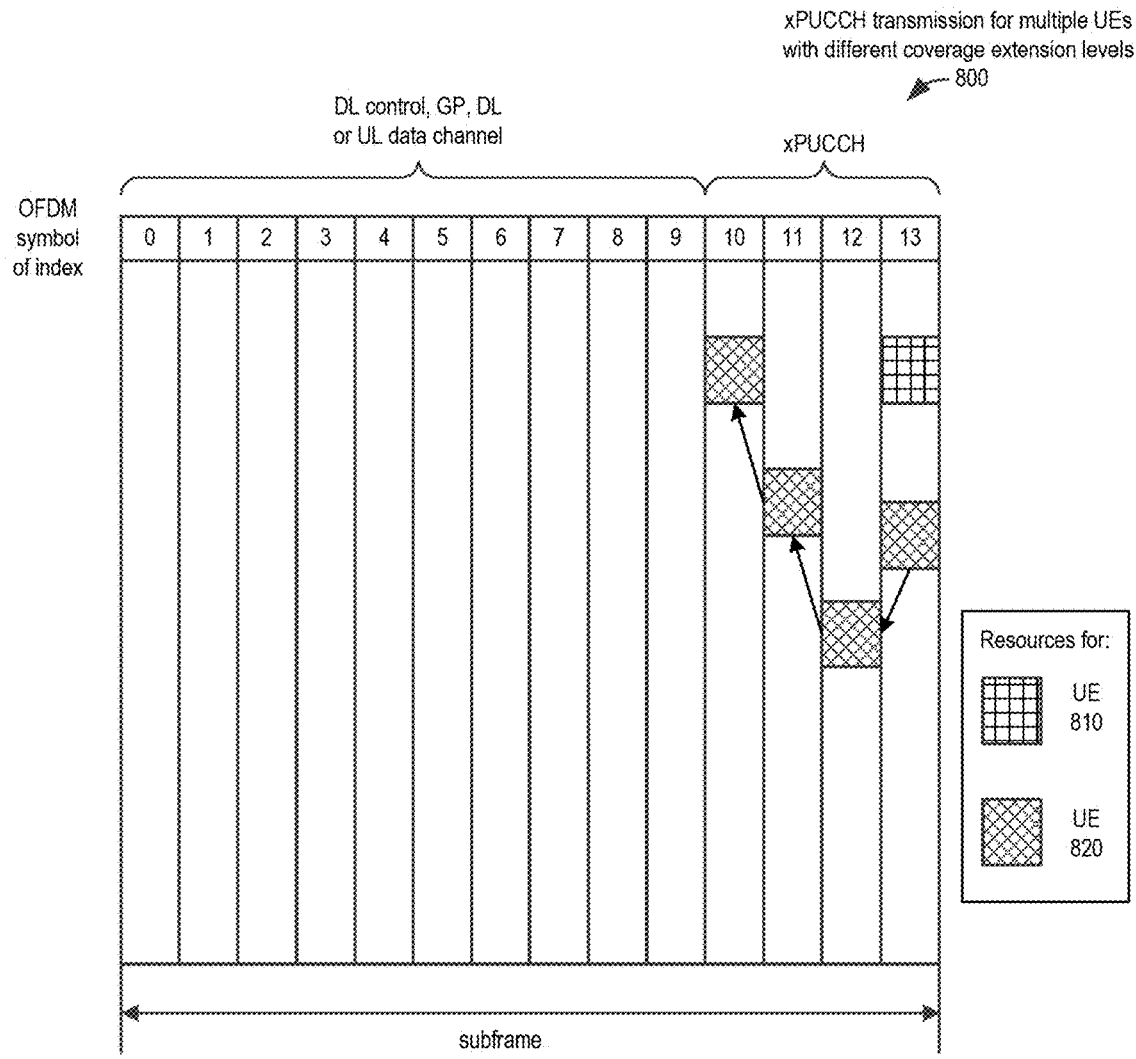
FIG. 8 is a block diagram of an xPUCCH transmission for multiple user equipment (UE) devices (or simply, UEs) having different coverage extension levels.

FIG. 8 illustrates an example 800 of xPUCCH transmission for multiple UEs 810 and 820 having different coverage extension levels. As shown in FIG. 8, one subframe includes 14 symbols and the first 10 symbols are used for xPDCCH, GP, and xPDSCH or xPUSCH. The last four symbols are used for xPUCCH transmission. In this example, UE 810 is allocated with one symbol for xPUCCH transmission (normal coverage) whereas UE 820 is allocated with four symbols for xPUCCH transmission with coverage extension level #1. For UE 820, resources used for xPUCCH transmitted in the symbols #10-12 are derived (e.g., through a predetermined rule) based on the resource configured in the symbol #13.

Figure 9:
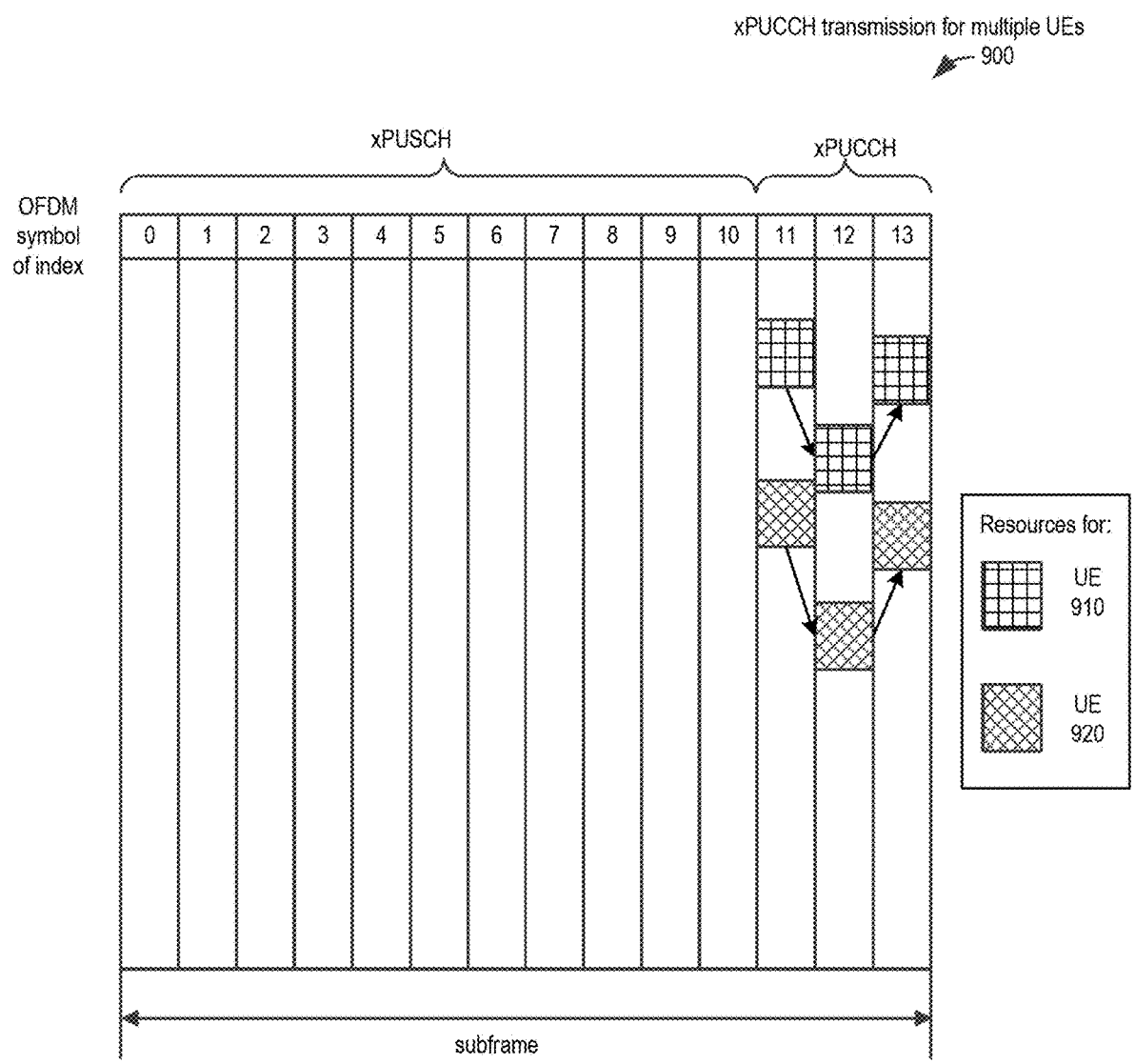
FIG. 9 is a block diagram of an xPUCCH transmission for multiple UEs having the same coverage extension levels or having a cell-specific resource allocation.

FIG. 9 illustrates an example 900 of the xPUCCH resource allocation for the multiple UEs 910 and 920, each having the same number of OFDM symbols allocated for xPUCCH transmissions. In other words, the amount of xPUCCH resources within the xPUCCH region is configured semi-statically in a cell-specific manner by higher layers via RRC signaling. FIG. 9 also shows that resources are derived based on the initial (as opposed to final) bookend resource within the xPUCCH region. Thus, UE 910 and UE 920 both derive from a configured resource in a first symbol #11 of the xPUCCH region for the remaining symbols #12 and #13 in the xPUCCH region.

Figure 10:
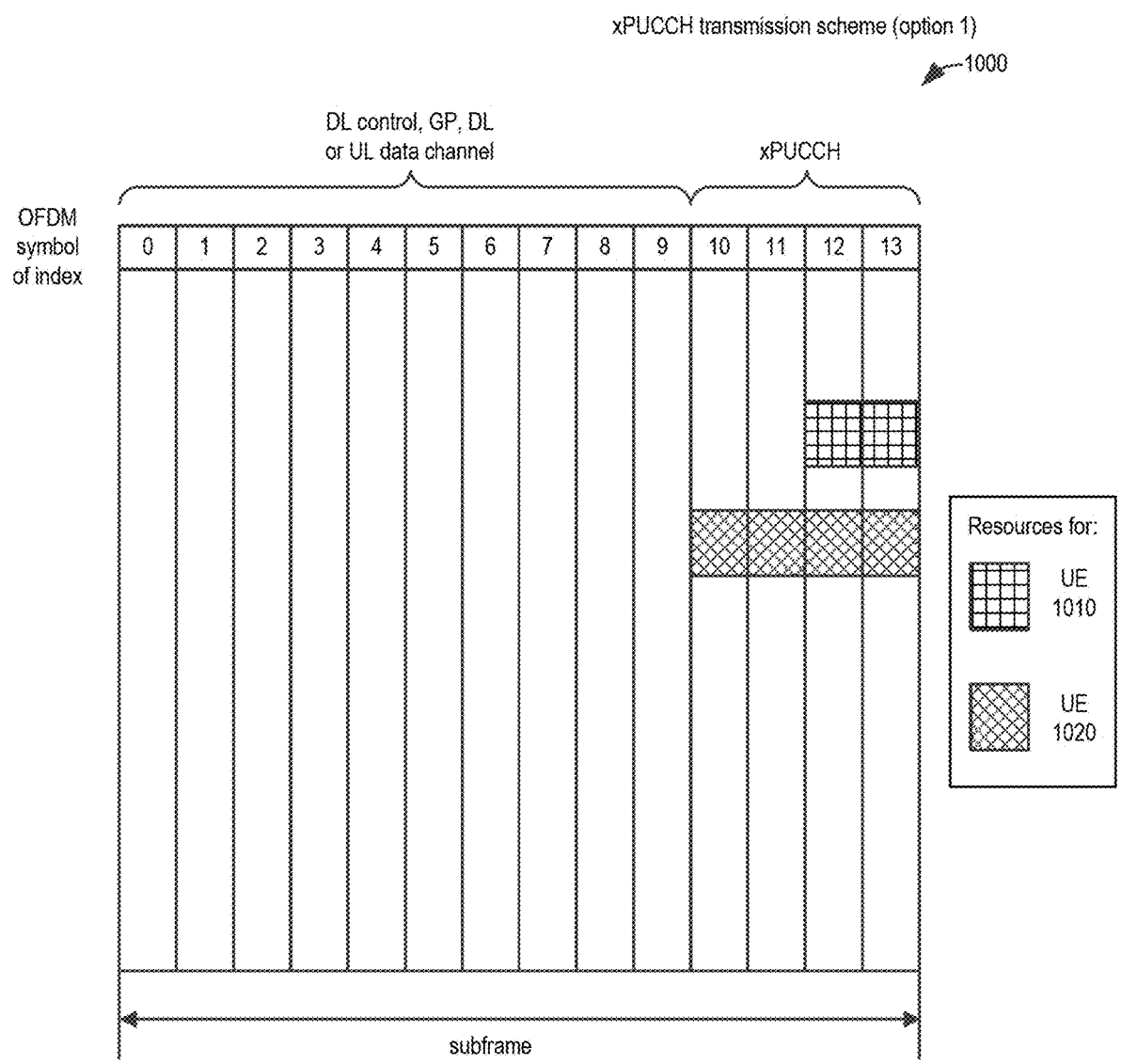
FIG. 10 is a block diagram of an xPUCCH transmission scheme, according to a first option.

FIG. 10 illustrates a first example 1000 of an xPUCCH transmission scheme. In this example, for both UEs 1010 and 1020, a same physical resource block (PRB) index is used for the xPUCCH transmission within the configured symbols. Accordingly, the resources allocated for the xPUCCH transmission within the xPUCCH region have the same PRB index (represented by the horizontal distribution across symbols) as that of a configured bookend resource (first or last symbols in the region). For this option, given that same resource is used for xPUCCH transmission, channel estimation performance can be improved, which may be desirable for the noise-limited scenario.

Figure 11:
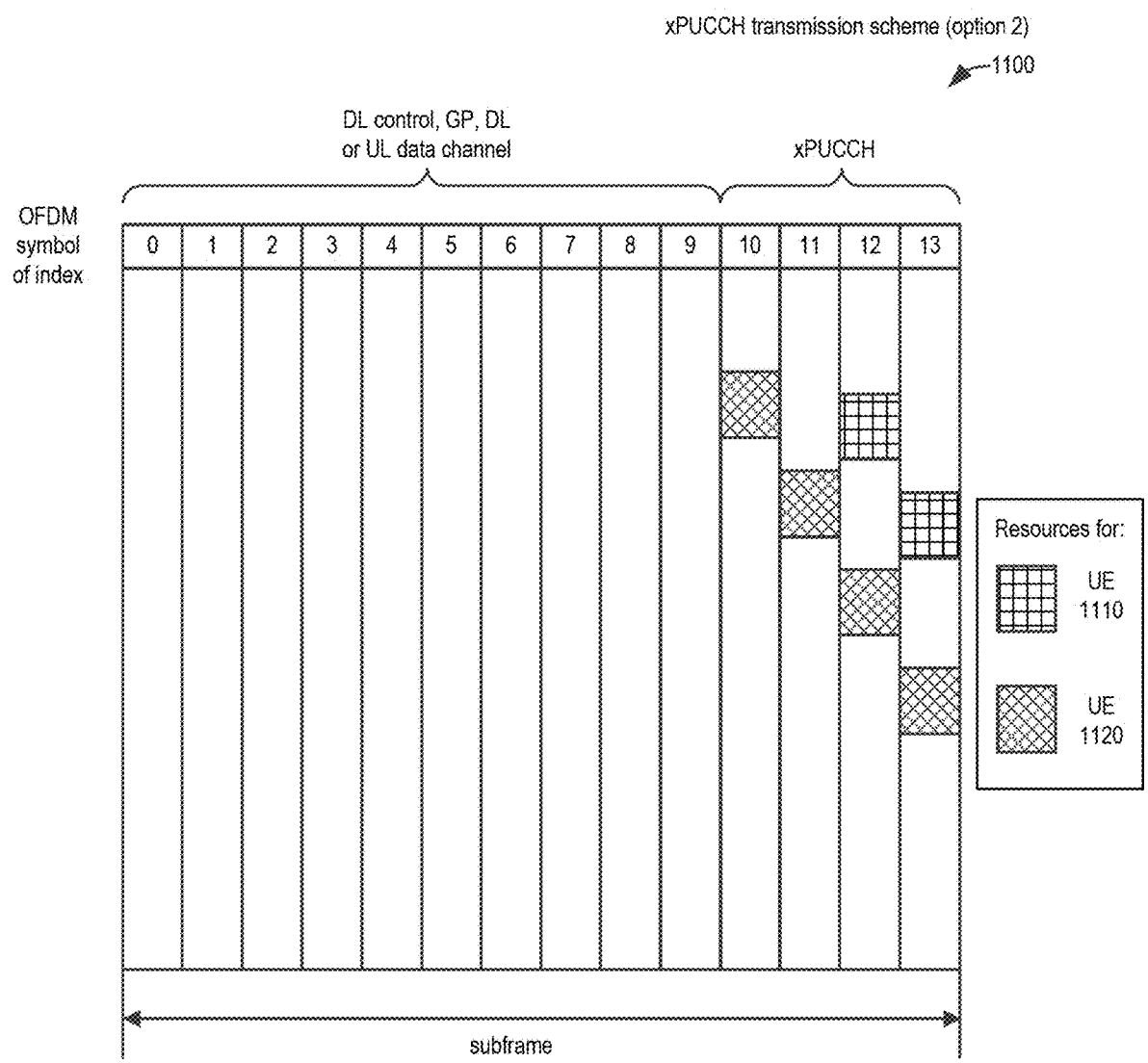
FIG. 11 is a block diagram of an xPUCCH transmission scheme, according to a second option.

FIG. 11 shows a second example 1100 in which frequency hopping is applied by each UE 1110 and 1120 for a resource allocation of the xPUCCH transmission in the configured symbols. Further, a constant frequency offset may be applied for resource allocation of xPUCCH transmission in the configured symbols other than first or last symbol. More specifically, a PRB index for the transmission of xPUCCH in a kth symbol within the xPUCCH region can be derived according to the following equation:

$$I_{PRB}^{(k)} = (I_{PRB}^{(0)} + \Delta_{PRB}) \bmod (N_{RB} - N_{PRB}^{xPUCCH})$$

where $I_{PRB}^{(0)}$ is the PRB index in the first symbol or last symbol which is configured by higher layers for xPUCCH transmission; $N_{RB}$ is the number of PRBs in the UL system bandwidth; $N_{PRB}^{xPUCCH}$ is the number of PRBs for each xPUCCH transmission; and $\Delta_{PRB}$ is the hopping distance, which can be predefined in the specification or configured by higher layers in a cell-specific manner. In one example, $\Delta_{PRB} = \lfloor N_{RB}/2 \rfloor$ or $\Delta_{PRB} = \lfloor N_{RB}/4 \rfloor$.

Figure 12:
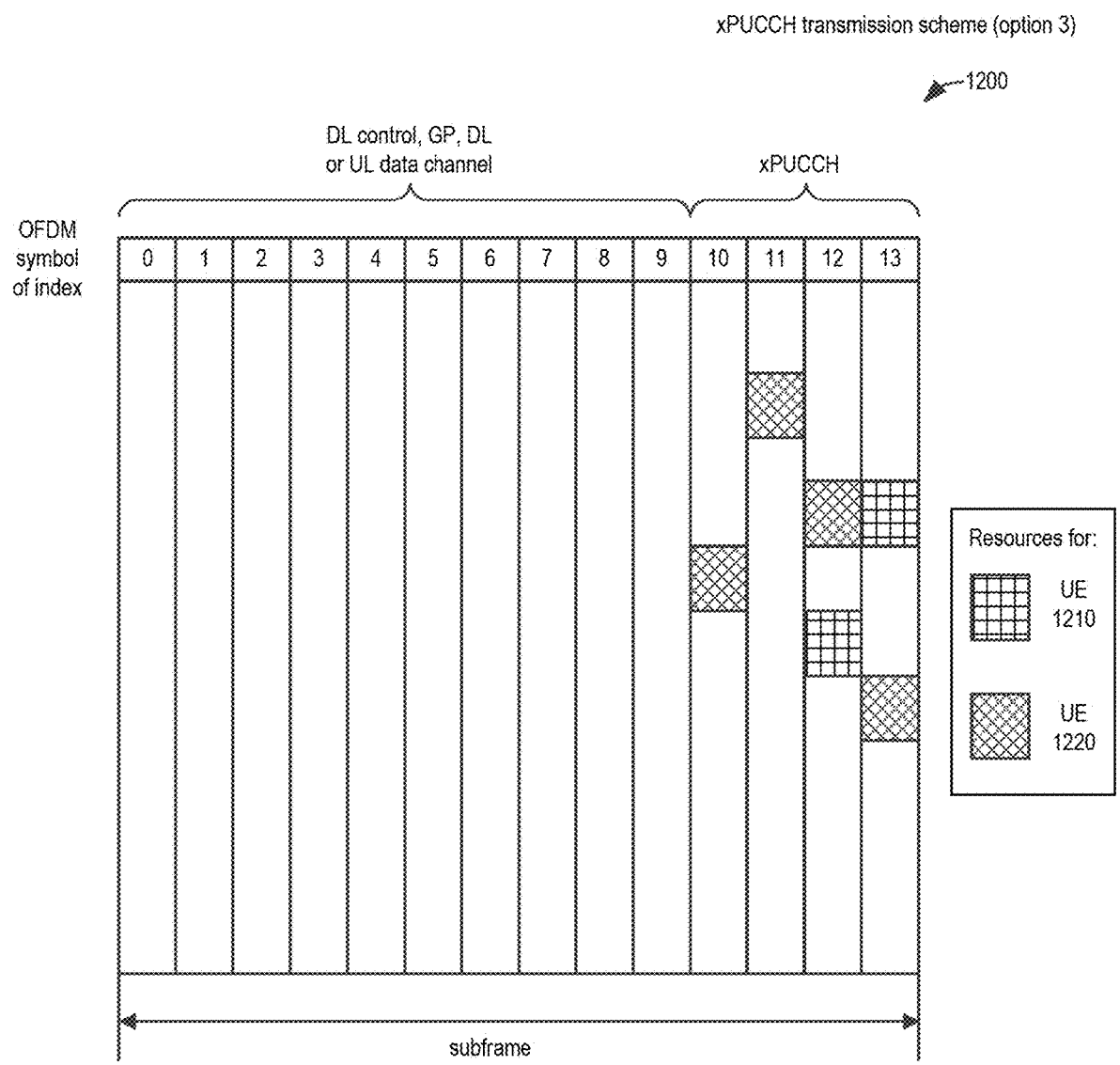
FIG. 12 is a block diagram of an xPUCCH transmission scheme, according to a third option.

FIG. 12 shows a third example 1200 in which frequency hopping is applied by each UE 1210 and 1220 for the resource allocation of the xPUCCH transmission in the configured symbols. Further, a frequency hopping pattern may be defined as a function of physical cell identity (ID), virtual cell ID, and/or symbol index within the configured xPUCCH region as well as the configured resource in the first or last symbol for the xPUCCH transmission. More specifically, the PRB index for the transmission of xPUCCH in the kth symbol within the xPUCCH region can be derived according to the following equation:

$$I_{PRB}^{(k)} = f(I_{PRB}^{(0)}, N_{cell}^{ID}, I_{sym})$$

where $N_{cell}^{ID}$ is the physical cell ID and $I_{sym}$ is the symbol index within the configured xPUCCH region.

Note that although not shown in FIGS. 8 and 10-12—which assume a UE-specific resource allocation for the transmission of xPUCCH—the number of symbols allocated for xPUCCH transmission may also be configured in a cell-specific manner, i.e., the number of symbols for xPUCCH transmission may be common across all UEs in the cell.

In another embodiment, inter-symbol hopping may be configured by the higher layers. In one example, inter-symbol hopping may be enabled or disabled via explicit signaling in the DCI format or RRC signaling.

In additional embodiments, the inter-symbol hopping pattern of xPUCCH depicted in FIGS. 9-11 may vary for different xPUCCH resources configured by higher layers. The reason behind this variance is to facilitate an eNB in dynamically selecting one feasible inter-symbol xPUCCH pattern depending on the instant channel condition experienced by a UE. For example, two xPUCCH resources are configured by an eNB for a particular UE. The first xPUCCH resource may enable xPUCCH hopping, whereas the second xPUCCH resource may disable xPUCCH hopping when transmitting an xPUCCH over multiple UL symbols. Based on UE feedback or eNB measurement, the first xPUCCH resource may be selected by the eNB to obtain the frequency diversity gain for the xPUCCH channel. And the second xPUCCH resource may be chosen if CSI information is available to implement a frequency selective scheduling to improve the performance.

Example Devices and Circuitry

Figure 13:
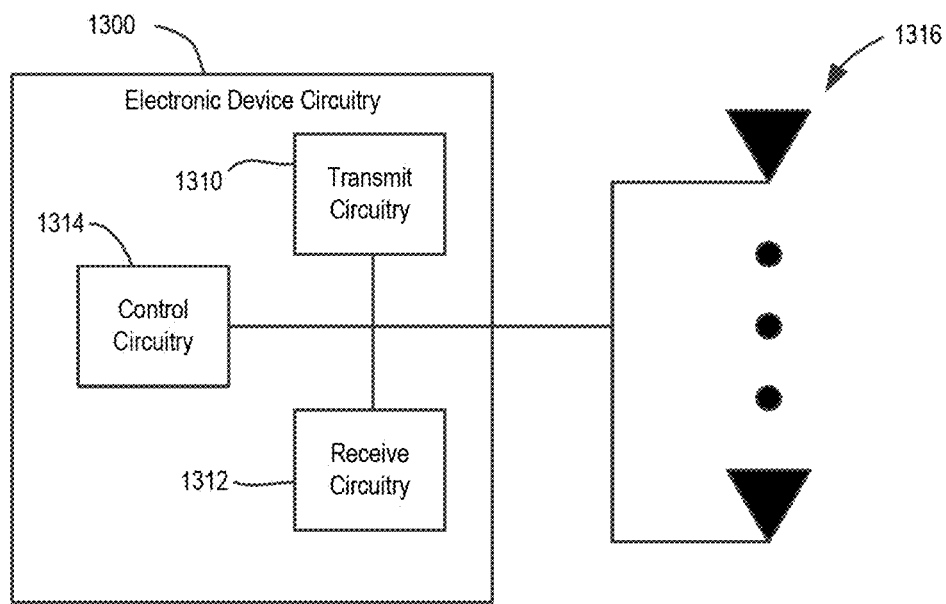
FIG. 13 is a block diagram illustrating electronic device circuitry that may be UE circuitry, evolved universal terrestrial access network (EUTRAN) Node B (evolved Node B, eNodeB, or eNB) circuitry, network node circuitry, or other types of circuitry, according to one embodiment.

FIG. 13 is a block diagram illustrating electronic device circuitry 1300 that may be eNB circuitry, UE circuitry, network node circuitry, or some other type of circuitry in accordance with various embodiments. As used herein, the term "circuitry" may refer to, be part of, or include an application specific integrated circuit (ASIC), an electronic circuit, a processor (shared, dedicated, or group), and/or memory (shared, dedicated, or group) that executes one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In embodiments, the electronic device circuitry 1300 may be, or may be incorporated into or otherwise a part of, an eNB, a UE, a network node, or some other type of electronic device. In embodiments, the electronic device circuitry 1300 may include radio transmit circuitry 1310 and receive circuitry 1312 coupled to control circuitry 1314. In embodiments, the transmit circuitry 1310 and/or receive circuitry 1312 may be elements or modules of transceiver circuitry, as shown. The electronic device circuitry 1300 may be coupled with one or more antenna elements 1316 of one or more antennas. The electronic device circuitry 1300 and/or the components of the electronic device circuitry 1300 may be configured to perform operations similar to those described elsewhere in this disclosure.

Figure 14:
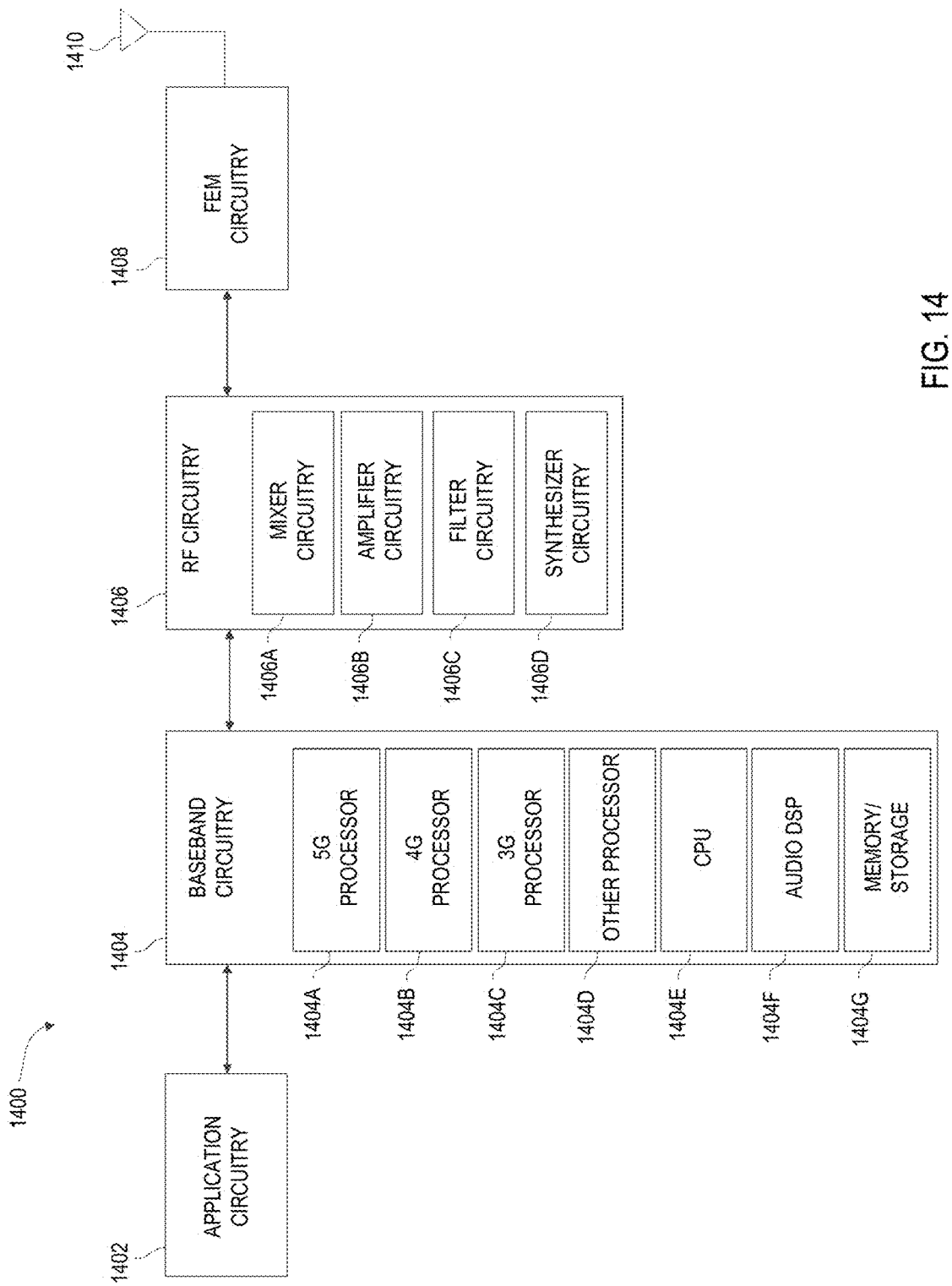
FIG. 14 is a block diagram illustrating components of a UE device according to one embodiment.

FIG. 14 is a block diagram illustrating, for one embodiment, example components of a UE device 1400. In some embodiments, the UE device 1400 may include application circuitry 1402, baseband circuitry 1404, radio frequency (RF) circuitry 1406, front-end module (FEM) circuitry 1408, and one or more antennas 1410, coupled together at least as shown in FIG. 14.

The application circuitry 1402 may include one or more application processors. By way of non-limiting example, the application circuitry 1402 may include one or more single-core or multi-core processors. The processor(s) may include any combination of general-purpose processors and dedicated processors (e.g., graphics processors, application processors, etc.). The processor(s) may be operably coupled to and/or include memory/storage, and may be configured to execute instructions stored in the memory/storage to enable various applications and/or operating systems to run on the system.

By way of non-limiting example, the baseband circuitry 1404 may include one or more single-core or multi-core processors. The baseband circuitry 1404 may include one or more baseband processors and/or control logic. The baseband circuitry 1404 may be configured to process baseband signals received from a receive signal path of the RF circuitry 1406. The baseband circuitry 1404 may also be configured to generate baseband signals for a transmit signal path of the RF circuitry 1406. The baseband circuitry 1404 may interface with the application circuitry 1402 for generation and processing of the baseband signals, and for controlling operations of the RF circuitry 1406.

By way of non-limiting example, the baseband circuitry 1404 may include at least one of a fifth generation (5G) baseband processor 1404A, a fourth generation (4G) baseband processor 1404B, a third generation (3G) baseband processor 1404C, and other baseband processor(s) 1404D for other existing generations and generations in development or to be developed in the future (e.g., sixth generation (6G), etc.). The baseband circuitry 1404 (e.g., at least one of the baseband processors 1404A-1404D) may handle various radio control functions that enable communication with one or more radio networks via the RF circuitry 1406. By way of non-limiting example, the radio control functions may include signal modulation/demodulation, encoding/decoding, radio frequency shifting, other functions, and combinations thereof. In some embodiments, modulation/demodulation circuitry of the baseband circuitry 1404 may be programmed to perform fast Fourier transform (FFT), precoding, constellation mapping/demapping functions, other functions, and combinations thereof. In some embodiments, encoding/decoding circuitry of the baseband circuitry 1404 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 1404 may include elements of a protocol stack. By way of non-limiting example, elements of an evolved universal terrestrial radio access network (EUTRAN) protocol include, for example, physical (PHY), MAC, radio link control (RLC), packet data convergence protocol (PDCP), and/or radio resource control (RRC) elements. A central processing unit (CPU) 1404E of the baseband circuitry 1404 may be programmed to run elements of the protocol stack for signaling of the PHY, MAC, RLC, PDCP, and/or RRC layers. In some embodiments, the baseband circuitry 1404 may include one or more audio digital signal processor(s) (DSP) 1404F. The audio DSP(s) 1404F may include elements for compression/decompression and echo cancellation. The audio DSP(s) 1404F may also include other suitable processing elements.

The baseband circuitry 1404 may further include memory/storage 1404G. The memory/storage 1404G may include data and/or instructions for operations performed by the processors of the baseband circuitry 1404 stored thereon. In some embodiments, the memory/storage 1404G may include any combination of suitable volatile memory and/or non-volatile memory. The memory/storage 1404G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 1404G may be shared among the various processors or dedicated to particular processors.

Components of the baseband circuitry 1404 may be suitably combined in a single chip or a single chipset, or disposed on a same circuit board in some embodiments. In some embodiments, some or all of the constituent components of the baseband circuitry 1404 and the application circuitry 1402 may be implemented together, such as, for example, on a system on a chip (SOC).

In some embodiments, the baseband circuitry 1404 may provide for communication compatible with one or more radio technologies. For example, in some embodiments, the baseband circuitry 1404 may support communication with an evolved universal terrestrial radio access network (EUTRAN) and/or other wireless metropolitan area networks (WMAN), a wireless local area network (WLAN), or a wireless personal area network (WPAN). Embodiments in which the baseband circuitry 1404 is configured to support radio communications of more than one wireless protocol may be referred to as multi-mode baseband circuitry.

The RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. The RF circuitry 1406 may include a receive signal path, which may include circuitry to down-convert RF signals received from the FEM circuitry 1408, and provide baseband signals to the baseband circuitry 1404. The RF circuitry 1406 may also include a transmit signal path, which may include circuitry to up-convert baseband signals provided by the baseband circuitry 1404, and provide RF output signals to the FEM circuitry 1408 for transmission.

In some embodiments, the RF circuitry 1406 may include a receive signal path and a transmit signal path. The receive signal path of the RF circuitry 1406 may include mixer circuitry 1406A, amplifier circuitry 1406B, and filter circuitry 1406C. The transmit signal path of the RF circuitry 1406 may include the filter circuitry 1406C and the mixer circuitry 1406A. The RF circuitry 1406 may further include synthesizer circuitry 1406D configured to synthesize a frequency for use by the mixer circuitry 1406A of the receive signal path and the transmit signal path. In some embodiments, the mixer circuitry 1406A of the receive signal path may be configured to down-convert RF signals received from the FEM circuitry 1408 based on the synthesized frequency provided by the synthesizer circuitry 1406D. The amplifier circuitry 1406B may be configured to amplify the down-converted signals.

The filter circuitry 1406C may include a low-pass filter (LPF) or band-pass filter (BPF) configured to remove unwanted signals from the down-converted signals to generate output baseband signals. Output baseband signals may be provided to the baseband circuitry 1404 for further processing. In some embodiments, the output baseband signals may include zero-frequency baseband signals, although this is optional. In some embodiments, the mixer circuitry 1406A of the receive signal path may comprise passive mixers, although the scope of the embodiments is not limited in this respect.

In some embodiments, the mixer circuitry 1406A of the transmit signal path may be configured to up-convert input baseband signals based on the synthesized frequency provided by the synthesizer circuitry 1406D to generate RF output signals for the FEM circuitry 1408. The baseband signals may be provided by the baseband circuitry 1404 and may be filtered by the filter circuitry 1406C. The filter circuitry 1406C may include an LPF, although the scope of the embodiments is not limited in this respect.

In some embodiments, the mixer circuitry 1406A of the receive signal path and the mixer circuitry 1406A of the transmit signal path may include two or more mixers, and may be arranged for quadrature downconversion and/or upconversion, respectively. In some embodiments, the mixer circuitry 1406A of the receive signal path and the mixer circuitry 1406A of the transmit signal path may include two or more mixers and may be arranged for image rejection (e.g., Hartley image rejection). In some embodiments, the mixer circuitry 1406A of the receive signal path and the mixer circuitry 1406A of the transmit signal path may be arranged for direct downconversion and/or direct upconversion, respectively. In some embodiments, the mixer circuitry 1406A of the receive signal path and the mixer circuitry 1406A of the transmit signal path may be configured for super-heterodyne operation.

In some embodiments, the output baseband signals and the input baseband signals may be analog baseband signals, although the scope of the embodiments is not limited in this respect. In other embodiments, the output baseband signals and the input baseband signals may be digital baseband signals. In such embodiments, the RF circuitry 1406 may include analog-to-digital converter (ADC) and digital-to-analog converter (DAC) circuitry, and the baseband circuitry 1404 may include a digital baseband interface to communicate with the RF circuitry 1406.

In some dual-mode embodiments, separate radio integrated circuit (IC) circuitry may be provided for processing signals for each spectrum, although the scope of the embodiments is not limited in this respect.

In some embodiments, the synthesizer circuitry 1406D may include one or more of a fractional-N synthesizer and a fractional N/N+1 synthesizer, although the scope of the embodiments is not limited in this respect, as other types of frequency synthesizers may be suitable. For example, the synthesizer circuitry 1406D may include a delta-sigma synthesizer, a frequency multiplier, a synthesizer comprising a phase-locked loop with a frequency divider, other synthesizers, and combinations thereof.

The synthesizer circuitry 1406D may be configured to synthesize an output frequency for use by the mixer circuitry 1406A of the RF circuitry 1406 based on a frequency input and a divider control input. In some embodiments, the synthesizer circuitry 1406D may be a fractional N/N+1 synthesizer.

In some embodiments, frequency input may be provided by a voltage controlled oscillator (VCO). Divider control input may be provided by either the baseband circuitry 1404 or the application circuitry 1402 depending on the desired output frequency. In some embodiments, a divider control input (e.g., N) may be determined from a look-up table based on a channel indicated by the application circuitry 1402.

The synthesizer circuitry 1406D of the RF circuitry 1406 may include a divider, a delay-locked loop (DLL), a multiplexer, and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry-out) to provide a fractional division ratio. In some example embodiments, the DLL may include a set of cascaded, tunable, delay elements; a phase detector; a charge pump; and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 1406D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 1406 may include an IQ/polar converter.

The FEM circuitry 1408 may include a receive signal path, which may include circuitry configured to operate on RF signals received from one or more antennas 1410, amplify the received signals, and provide the amplified versions of the received signals to the RF circuitry 1406 for further processing. The FEM circuitry 1408 may also include a transmit signal path, which may include circuitry configured to amplify signals for transmission provided by the RF circuitry 1406 for transmission by at least one of the antennas 1410.

In some embodiments, the FEM circuitry 1408 may include a TX/RX switch configured to switch between a transmit mode and a receive mode operation. The FEM circuitry 1408 may include a receive signal path and a transmit signal path. The receive signal path of the FEM circuitry 1408 may include a low-noise amplifier (LNA) to amplify received RF signals and provide the amplified received RF signals as an output (e.g., to the RF circuitry 1406). The transmit signal path of the FEM circuitry 1408 may include a power amplifier (PA) configured to amplify input RF signals (e.g., provided by RF circuitry 1406), and one or more filters configured to generate RF signals for subsequent transmission (e.g., by one or more of the antennas 1410).

In some embodiments, the UE device 1400 may include additional elements such as, for example, memory/storage, a display, a camera, one or more sensors, an input/output (I/O) interface, other elements, and combinations thereof.

In some embodiments, the UE device 1400 may be configured to perform one or more processes, techniques, and/or methods as described herein, or portions thereof.

In some embodiments, the UE device 1400 of FIG. 14 may be configured to perform one or more processes, techniques, and/or methods as described herein, or portions thereof. Embodiments described herein may be implemented into a system using any suitably configured hardware and/or software. In the software context, various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium in which, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Figure 15:
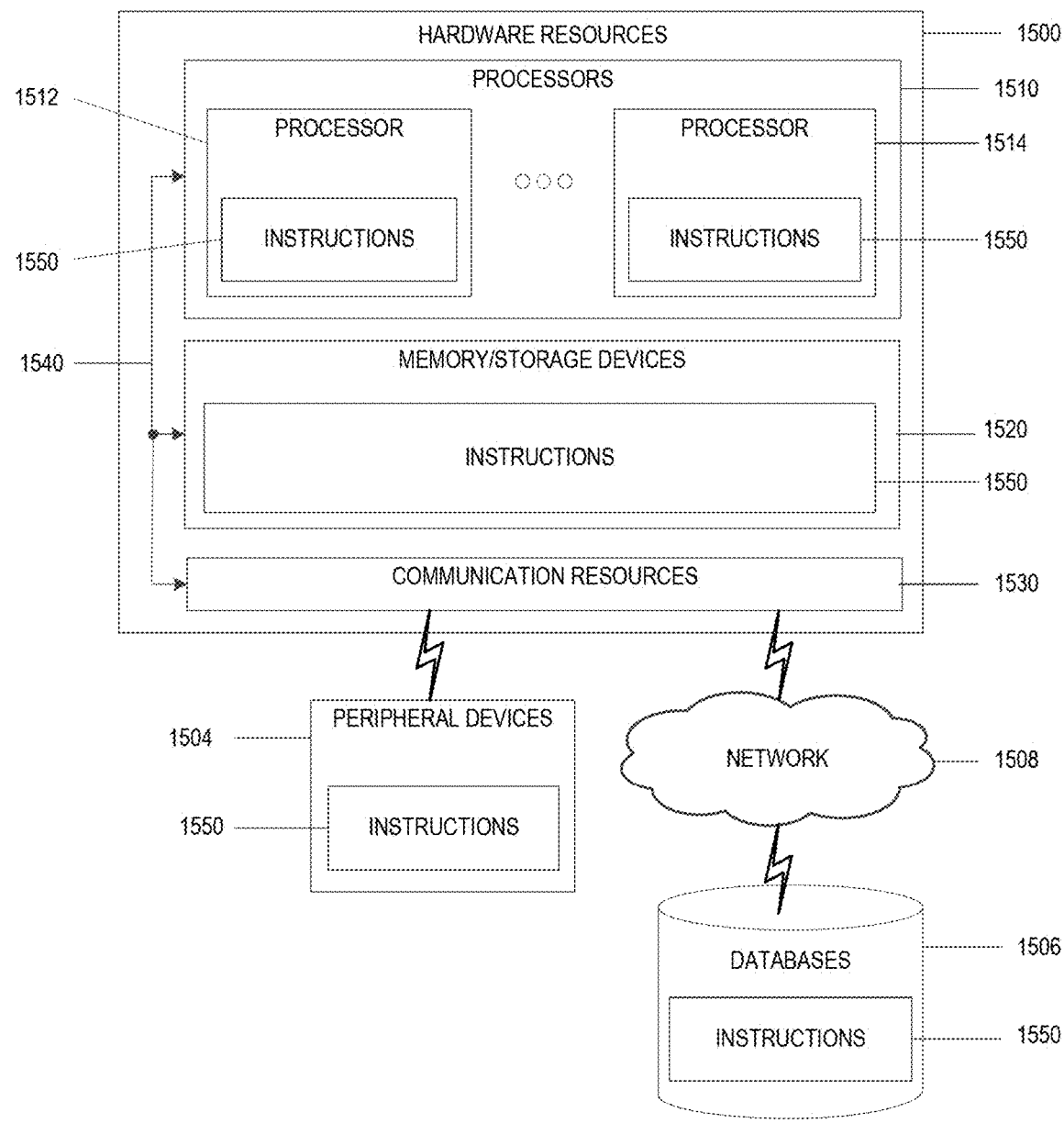
FIG. 15 is a block diagram illustrating components according to some embodiments.

FIG. 15 is a block diagram illustrating components, according to some example embodiments, that can read instructions from a machine-readable or computer-readable medium (e.g., a machine-readable storage medium) and perform any one or more of the methodologies discussed herein. Specifically, FIG. 15 shows a diagrammatic representation of hardware resources 1500 including one or more processors (or processor cores) 1510, one or more memory/storage devices 1520, and one or more communication resources 1530, each of which is communicatively coupled via a bus 1540.

The processors 1510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1512 and a processor 1514. The memory/storage devices 1520 may include main memory, disk storage, or any suitable combination thereof.

The communication resources 1530 may include interconnection and/or network interface components or other suitable devices to communicate with one or more peripheral devices 1504 and/or one or more databases 1506 via a network 1508. For example, the communication resources 1530 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1550 may comprise software, a program, an application, an applet, an app, or other executable code for causing at least one of the processors 1510 to perform any one or more of the methodologies discussed herein. The instructions 1550 may reside, completely or partially, within at least one of the processors 1510 (e.g., within the processor's cache memory), the memory/storage devices 1520, or any suitable combination thereof. Furthermore, any portion of the instructions 1550 may be transferred to the hardware resources 1500 from any combination of the peripheral devices 1504 and/or the databases 1506. Accordingly, the memory of the processors 1510, the memory/storage devices 1520, the peripheral devices 1504, and the databases 1506 are examples of computer-readable and machine-readable media.

EXAMPLES

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

Example 1

An apparatus of a user equipment (UE) configurable for wireless communication in a fifth generation (5G) long term evolution (LTE) system, the apparatus comprising circuitry to: de-multiplex orthogonal frequency-division multiplexed (OFDM) symbols of a self-contained data subframe including a 5G physical downlink control channel (xPDCCH), a data channel, a 5G physical uplink control channel (xPUCCH), and a guard period temporally adjacent the data channel; determine, based on a configurable xPUCCH resource allocation of the xPUCCH, a region of the self-contained data subframe for the xPUCCH, in which the region corresponds to a first region for a first coverage level and includes a final OFDM symbol of the self-contained data subframe, and in which the region corresponds to a second region for a second coverage level and encompasses multiple OFDM symbols including the final OFDM symbol, the second coverage level being greater than the first coverage level; and encode xPUCCH data to include uplink control information (UCI) for transmission in the region defined by the configurable xPUCCH resource allocation.

Example 2

The apparatus of example 1, in which a different number of OFDM symbols are allocated for the UCI in the xPUCCH for different coverage levels in downlink (DL) and uplink (UL) types of the self-contained data subframe.

Example 3

The apparatus of example 1, in which the circuitry is further configured to multiplex the xPUCCH with the data channel in a time-division multiplexed (TDM) manner.

Example 4

The apparatus of example 3, in which the data channel of the self-contained data subframe comprises a 5G physical downlink shared channel (xPDSCH).

Example 5

The apparatus of example 3, in which the data channel of the self-contained data subframe comprises a 5G physical uplink shared channel (xPUSCH).

Example 6

The apparatus of example 5, in which the circuitry is further configured to: for the first coverage level indicating no coverage extension or an intermediate coverage extension, multiplex the xPUCCH and the xPUSCH in the TDM manner; and for the second coverage level comprising a maximum coverage extension level, multiplex the xPUCCH and the xPUSCH in a frequency-division multiplexed (FDM) manner.

Example 7

The apparatus of example 1, in which the circuitry is further configured to encode different UCI types for transmission on separate xPUCCH resources of the xPUCCH.

Example 8

The apparatus of example 7, in which the circuitry is further configured to: encode a first UCI type for transmission on the final OFDM symbol; and encode a second UCI type, different from the first UCI type, for transmission on a penultimate OFDM symbol of the self-contained subframe.

Example 9

The apparatus of example 7 or 8, in which the separate xPUCCH resources configured to carry the different UCI types have a different number of resources in the self-contained subframe.

Example 10

The apparatus of example 7 or 8, in which the separate xPUCCH resources configured to carry the different UCI types share a common multiplexing scheme with other channels of the self-contained subframe.

Example 11

The apparatus of example 1, in which a number of xPUCCH symbols allocated for the xPUCCH is predefined, defined as a function of system bandwidth, or based on a higher-layer configuration message.

Example 12

The apparatus of example 1, in which the circuitry is further configured to process a 5G master information block (xMIB), a 5G system information block (xSIB), or radio resource control (RRC) signaling to determine a number of xPUCCH symbols allocated for the xPUCCH.

Example 13

The apparatus of example 1, in which a set for the number of xPUCCH symbols is predefined or configured by higher layers via a 5G master information block (xMIB), a 5G system information block (xSIB) or radio resource control (RRC) signaling.

Example 14

The apparatus of example 1, in which the circuitry is further configured to process downlink control information (DCI) from a 5G physical downlink control channel (xPDCCH) to determine from an xPUCCH resource allocation field of the DCI a number of xPUCCH symbols allocated for the xPUCCH.

Example 15

The apparatus of example 14, in which the xPUCCH resource allocation field indicates a member from a set of values representing a number of xPUCCH symbols configured by higher-layer signaling.

Example 16

The apparatus of example 1, in which the circuitry is further configured to determine a number of xPUCCH symbols based on a value signaled through a control channel aggregation level of an associated xPDCCH transmission.

Example 17

The apparatus of example 1, in which the circuitry is further configured to determine a number of xPUCCH symbols by processing an indication from a dedicated control channel.

Example 18

The apparatus of example 1, in which the data channel comprises a 5G physical downlink shared channel (xPDSCH) or a 5G physical uplink shared channel (xPUSCH), the circuitry further configured to process a 5G master information block (xMIB), a 5G system information block (xSIB), radio resource control (RRC) signaling, or downlink control information (DCI) to determine a duration or a number of OFDM symbols allocated for the xPDSCH or the xPUSCH.

Example 19

The apparatus of example 1, in which the circuitry is further configured to: determine whether more than one OFDM symbol is allocated for the xPUCCH; and in response to determining that more than one OFDM symbol is allocated for the xPUCCH, derive, based on an initial or a final OFDM symbol allocated for the xPUCCH, a resource allocated for an xPUCCH transmission in an OFDM symbol other than the initial or the final OFDM symbol allocated for the xPUCCH.

Example 20

The apparatus of example 19, in which the circuitry is further configured to apply frequency hopping for the resource allocation of the xPUCCH transmission in configured symbols.

Example 21

The apparatus of example 20, in which the circuitry is further configured to apply the frequency hopping according to constant frequency offsets applied to the resource allocation of xPUCCH transmission in the configured symbols.

Example 22

The apparatus of example 19 or 20, in which a physical resource block (PRB) index for the xPUCCH transmission in a kth symbol within a xPUCCH region is derived according to $$I_{PRB}^{(k)}=(I_{PRB}^{(0)}+\Delta_{PRB})\bmod(N_{RB}-N_{PRB}^{xPUCCH})$$

where $I_{PRB}^{(0)}$ is a physical resource block (PRB) index in the initial or the final OFDM symbol configured for the xPUCCH transmission; $N_{RB}$ is a number of PRBs available in the UL system bandwidth; $N_{PRB}^{xPUCCH}$ is a number of PRBs for each xPUCCH transmission; and $\Delta_{PRB}$ is a hopping distance that is predefined or configured by higher layers in a cell-specific manner.

Example 23

The apparatus of example 20, in which the circuitry is further configured to apply the frequency hopping according to a frequency hopping pattern initiated from the initial or the final OFDM symbol and defined as a function of physical cell identity (ID), virtual cell ID, and/or symbol index within a configured xPUCCH region.

Example 24

The apparatus of example 20, in which inter-symbol hopping is configured by higher-layer signaling.

Example 25

The apparatus of example 20 or 24, in which inter-symbol hopping is enabled or disabled via explicit signaling in downlink control information (DCI) or radio resource control (RRC) signaling.

Example 26

The apparatus of example 20, in which an inter-symbol hopping pattern of the xPUCCH varies for different xPUCCH resources configured by higher-layer signaling.

Example 27

The apparatus of any of example 20 and 24-26, in which inter-symbol hopping is enabled for a first xPUCCH resource while inter-symbol hopping is disabled for a second xPUCCH resource.

Example 28

An apparatus of a user equipment (UE) configured to employ a fifth generation (5G) physical uplink control channel (xPUCCH) in a self-contained data subframe including a 5G physical downlink control channel (xPDCCH), a data channel, a guard period temporally adjacent the data channel, and the xPUCCH, the apparatus comprising circuitry to: determine whether more than one orthogonal frequency-division multiplexed (OFDM) symbol is allocated for the xPUCCH; and in response to determining that more than one OFDM symbol is allocated for the xPUCCH, derive, based on an initial or a final OFDM symbol allocated for the xPUCCH, a resource allocated for an xPUCCH transmission in an OFDM symbol other than the initial or the final OFDM symbol allocated for the xPUCCH.

Example 29

The apparatus of example 28, in which the circuitry is further configured to apply frequency hopping for the resource allocation of the xPUCCH transmission in configured symbols.

Example 30

The apparatus of example 29, in which the circuitry is further configured to apply the frequency hopping according to constant frequency offsets applied to the resource allocation of xPUCCH transmission in the configured symbols.

Example 31

The apparatus of example 28 or 29, in which a physical resource block (PRB) index for the xPUCCH transmission in a kth symbol within a xPUCCH region is derived according to $$I_{PRB}^{(k)}=(I_{PRB}^{(0)}+\Delta_{PRB})\bmod(N_{RB}-N_{PRB}^{xPUCCH})$$

where $I_{PRB}^{(0)}$ is a physical resource block (PRB) index in the initial or the final OFDM symbol configured for the xPUCCH transmission; $N_{RB}$ is a number of PRBs available in the UL system bandwidth; $N_{PRB}^{xPUCCH}$ is a number of PRBs for each xPUCCH transmission; and $\Delta_{PRB}$ is a hopping distance that is predefined or configured by higher layers in a cell-specific manner.

Example 32

The apparatus of example 29, in which the circuitry is further configured to apply the frequency hopping according to a frequency hopping pattern initiated from the initial or the final OFDM symbol and defined as a function of physical cell identity (ID), virtual cell ID, and/or symbol index within a configured xPUCCH region.

Example 33

The apparatus of example 29, in which inter-symbol hopping is configured by higher-layer signaling.

Example 34

The apparatus of example 29 or 33, in which inter-symbol hopping is enabled or disabled via explicit signaling in downlink control information (DCI) or radio resource control (RRC) signaling.

Example 35

The apparatus of example 29, in which an inter-symbol hopping pattern of the xPUCCH varies for different xPUCCH resources configured by higher-layer signaling.

Example 36

The apparatus of any of examples 29 and 33-35, in which inter-symbol hopping is enabled for a first xPUCCH resource while inter-symbol hopping is disabled for a second xPUCCH resource.

Example 37

An apparatus of a user equipment (UE) configured to generate different uplink control information (UCI) types for transmission on separate physical uplink control channel (PUCCH) resources allocated for a self-contained subframe in a fifth generation (5G) long term evolution (LTE) system, the apparatus comprising circuitry to: determine a resource allocation for the separate PUCCH resources allocated for a self-contained subframe, in which the resource allocation encompasses resources across multiple orthogonal frequency-division multiplexed (OFDM) symbols; generate a first UCI type for transmission in a first one of the separate PUCCH resources including a first portion of the resource allocation that includes at least part of a final OFDM symbol; and generate a second UCI type, different from the first UCI type, for transmission in a second one of the separate PUCCH resources including a second portion, different from the first portion, of the resource allocation.

Example 38

The apparatus of example 37, in which the separate PUCCH resources configured to carry the different UCI types have a different proportion of resources in the self-contained subframe.

Example 39

The apparatus of example 37, in which the separate PUCCH resources configured to carry the different UCI types share a common multiplexing scheme with other channels of the self-contained subframe.

Example 40

The apparatus of example 37, in which the first one of the separate PUCCH resources is time-division multiplexed (TDM) with other channels of the self-contained subframe.

Example 41

The apparatus of example 37, in which the second one of the separate PUCCH resources is time-division multiplexed (TDM) with other channels of the self-contained subframe.

Example 42

The apparatus of example 37, in which the self-contained subframe is an uplink (UL) data subframe.

Example 43

The apparatus of example 42, in which the first one of the separate PUCCH resources is frequency-division multiplexed (FDM) with other channels of the self-contained subframe.

Example 44

The apparatus of example 42, in which the second one of the separate PUCCH resources is frequency-division multiplexed (FDM) with other channels of the self-contained subframe.

Example 45

The apparatus of example 37, in which the first one of the separate PUCCH resources is the final OFDM symbol in the self-contained subframe.

Example 46

The apparatus of example 37, in which the first one of the separate PUCCH resources is multiple OFDM symbols including the final OFDM symbol in the self-contained subframe.

Example 47

A method, performed by a user equipment (UE), of wireless communication in a fifth generation (5G) long term evolution (LTE) system, the method comprising: processing a self-contained data subframe including a 5G physical downlink control channel (xPDCCH), a data channel, a 5G physical uplink control channel (xPUCCH), and a guard period temporally adjacent the data channel; determining, based on a configurable xPUCCH resource allocation of the xPUCCH, a region of the self-contained data subframe for the xPUCCH, in which the region corresponds to a first region for a first coverage level and includes a final orthogonal frequency-division multiplexed (OFDM) symbol of the self-contained data subframe, and in which the region corresponds to a second region for a second coverage level and encompasses multiple OFDM symbols including the final OFDM symbol, the second coverage level being greater than the first coverage level; and generating uplink control information (UCI) for transmission in the region defined by the configurable xPUCCH resource allocation.

Example 48

The method of example 47, in which a different number of OFDM symbols are allocated for the UCI in the xPUCCH for different coverage levels in downlink (DL) and uplink (UL) types of the self-contained data subframe.

Example 49

The method of example 47, further comprising multiplexing the xPUCCH with the data channel in a time-division multiplexed (TDM) manner.

Example 50

The method of example 49, in which the data channel of the self-contained data subframe comprises a 5G physical downlink shared channel (xPDSCH).

Example 51

The method of example 49, in which the data channel of the self-contained data subframe comprises a 5G physical uplink shared channel (xPUSCH).

Example 52

The method of example 51, further comprising: for the first coverage level indicating no coverage extension or an intermediate coverage extension, multiplexing the xPUCCH and the xPUSCH in the TDM manner; and for the second coverage level comprising a maximum coverage extension level, multiplexing the xPUCCH and the xPUSCH in a frequency-division multiplexed (FDM) manner.

Example 53

The method of example 47, further comprising generating different UCI types for transmission on separate xPUCCH resources of the xPUCCH.

Example 54

The method of example 53, further comprising: generating a first UCI type for transmission on the final OFDM symbol; and generating a second UCI type, different from the first UCI type, for transmission on a penultimate OFDM symbol of the self-contained subframe.

Example 55

The method of example 53 or 54, in which the separate xPUCCH resources carrying the different UCI types have a different number of resources in the self-contained subframe.

Example 56

The method of example 53 or 54, in which the separate xPUCCH resources carrying the different UCI types share a common multiplexing scheme with other channels of the self-contained subframe.

Example 57

The method of example 47, in which a number of xPUCCH symbols allocated for the xPUCCH is predefined, defined as a function of system bandwidth, or based on a higher-layer configuration message.

Example 58

The method of example 47, further comprising processing a 5G master information block (xMIB), a 5G system information block (xSIB), or radio resource control (RRC) signaling to determine a number of xPUCCH symbols allocated for the xPUCCH.

Example 59

The method of example 47, in which a set for the number of xPUCCH symbols is predefined or configured by higher layers via a 5G master information block (xMIB), a 5G system information block (xSIB) or radio resource control (RRC) signaling.

Example 60

The method of example 47, further comprising processing downlink control information (DCI) from a 5G physical downlink control channel (xPDCCH) to determine from an xPUCCH resource allocation field of the DCI a number of xPUCCH symbols allocated for the xPUCCH.

Example 61

The method of example 60, in which the xPUCCH resource allocation field indicates a member from a set of values representing a number of xPUCCH symbols configured by higher-layer signaling.

Example 62

The method of example 47, further comprising determining a number of xPUCCH symbols based on a value signaled through a control channel aggregation level of an associated xPDCCH transmission.

Example 63

The method of example 47, further comprising determining a number of xPUCCH symbols by processing an indication from a dedicated control channel.

Example 64

The method of example 47, in which the data channel comprises a 5G physical downlink shared channel (xPDSCH) or a 5G physical uplink shared channel (xPUSCH), the method further comprising processing a 5G master information block (xMIB), a 5G system information block (xSIB), radio resource control (RRC) signaling, or downlink control information (DCI) to determine a duration or a number of OFDM symbols allocated for the xPDSCH or the xPUSCH.

Example 65

The method of example 47, further comprising: determining whether more than one OFDM symbol is allocated for the xPUCCH; and in response to determining that more than one OFDM symbol is allocated for the xPUCCH, deriving, based on an initial or a final OFDM symbol allocated for the xPUCCH, a resource allocated for an xPUCCH transmission in an OFDM symbol other than the initial or the final OFDM symbol allocated for the xPUCCH.

Example 66

The method of example 65, further comprising applying frequency hopping for the resource allocation of the xPUCCH transmission in configured symbols.

Example 67

The method of example 66, further comprising applying the frequency hopping according to constant frequency offsets applied to the resource allocation of xPUCCH transmission in the configured symbols.

Example 68

The method of example 65 or 66, in which a physical resource block (PRB) index for the xPUCCH transmission in a kth symbol within a xPUCCH region is derived according to $$I_{PRB}^{(k)} = (I_{PRB}^{(0)} + \Delta_{PRB}) \mod(N_{RB} - N_{PRB}^{xPUCCH})$$

where $I_{PRB}^{(0)}$ is a physical resource block (PRB) index in the initial or the final OFDM symbol configured for the xPUCCH transmission; $N_{RB}$ is a number of PRBs available in the UL system bandwidth; $N_{PRB}^{xPUCCH}$ is a number of PRBs for each xPUCCH transmission; and $\Delta_{PRB}$ is a hopping distance that is predefined or configured by higher layers in a cell-specific manner.

Example 69

The method of example 66, further comprising applying the frequency hopping according to a frequency hopping pattern initiated from the initial or the final OFDM symbol and defined as a function of physical cell identity (ID), virtual cell ID, and/or symbol index within a configured xPUCCH region.

Example 70

The method of example 66, in which inter-symbol hopping is configured by higher-layer signaling.

Example 71

The method of example 66 or 70, in which inter-symbol hopping is enabled or disabled via explicit signaling in downlink control information (DCI) or radio resource control (RRC) signaling.

Example 72

The method of example 66, in which an inter-symbol hopping pattern of the xPUCCH varies for different xPUCCH resources configured by higher-layer signaling.

Example 73

The method of any of examples 66 and 70-72, in which inter-symbol hopping is enabled for a first xPUCCH resource while inter-symbol hopping is disabled for a second xPUCCH resource.

Example 74

A method, performed by a user equipment (UE), of configuring a fifth generation (5G) physical uplink control channel (xPUCCH) in a self-contained data subframe including a 5G physical downlink control channel (xPDCCH), a data channel, a guard period temporally adjacent the data channel, and the xPUCCH, the method comprising: determining whether more than one orthogonal frequency-division multiplexed (OFDM) symbol is allocated for the xPUCCH; and in response to determining that more than one OFDM symbol is allocated for the xPUCCH, deriving, based on an initial or a final OFDM symbol allocated for the xPUCCH, a resource allocated for an xPUCCH transmission in an OFDM symbol other than the initial or the final OFDM symbol allocated for the xPUCCH.

Example 75

The method of example 74, further comprising applying frequency hopping for the resource allocation of the xPUCCH transmission in configured symbols.

Example 76

The method of example 75, further comprising applying the frequency hopping according to constant frequency offsets applied to the resource allocation of xPUCCH transmission in the configured symbols.

Example 77

The method of example 74 or 75, in which a physical resource block (PRB) index for the xPUCCH transmission in the kth symbol within a xPUCCH region is derived according to $$I_{PRB}^{(k)} = (I_{PRB}^{(0)} + \Delta_{PRB}) \mod(N_{RB} - N_{PRB}^{xPUCCH})$$

where $I_{PRB}^{(0)}$ is a physical resource block (PRB) index in the initial or the final OFDM symbol configured for the xPUCCH transmission; $N_{RB}$ is a number of PRBs available in the UL system bandwidth; $N_{PRB}^{xPUCCH}$ is a number of PRBs for each xPUCCH transmission; and $\Delta_{PRB}$ is a hopping distance that is predefined or configured by higher layers in a cell-specific manner.

Example 78

The method of example 75, further comprising applying the frequency hopping according to a frequency hopping pattern initiated from the initial or the final OFDM symbol and defined as a function of physical cell identity (ID), virtual cell ID, and/or symbol index within a configured xPUCCH region.

Example 79

The method of example 75, in which inter-symbol hopping is configured by higher-layer signaling.

Example 80

The method of example 75 or 79, in which inter-symbol hopping is enabled or disabled via explicit signaling in downlink control information (DCI) or radio resource control (RRC) signaling.

Example 81

The method of example 75, in which an inter-symbol hopping pattern of the xPUCCH varies for different xPUCCH resources configured by higher-layer signaling.

Example 82

The method of any of examples 75 and 79-81, in which inter-symbol hopping is enabled for a first xPUCCH resource while inter-symbol hopping is disabled for a second xPUCCH resource.

Example 83

A method, performed by a user equipment (UE), of generating different uplink control information (UCI) types for transmission on separate physical uplink control channel (PUCCH) resources allocated for a self-contained subframe in a fifth generation (5G) long term evolution (LTE) system, the method comprising: determining a resource allocation for the separate PUCCH resources allocated for a self-contained subframe, in which the resource allocation encompasses resources across multiple orthogonal frequency-division multiplexed (OFDM) symbols; generating a first UCI type for transmission in a first one of the separate PUCCH resources including a first portion of the resource allocation that includes at least part of a final OFDM symbol; and generating a second UCI type, different from the first UCI type, for transmission in a second one of the separate PUCCH resources including a second portion, different from the first portion, of the resource allocation.

Example 84

The method of example 83, in which the separate PUCCH resources carrying the different UCI types have a different proportion of resources in the self-contained subframe.

Example 85

The method of example 83, in which the separate PUCCH resources carrying the different UCI types share a common multiplexing scheme with other channels of the self-contained subframe.

Example 86

The method of example 83, in which the first one of the separate PUCCH resources is time-division multiplexed (TDM) with other channels of the self-contained subframe.

Example 87

The method of example 83, in which the second one of the separate PUCCH resources is time-division multiplexed (TDM) with other channels of the self-contained subframe.

Example 88

The method of example 83, in which the self-contained subframe is an uplink (UL) data subframe.

Example 89

The method of example 88, in which the first one of the separate PUCCH resources is frequency-division multiplexed (FDM) with other channels of the self-contained subframe.

Example 90

The method of example 88, in which the second one of the separate PUCCH resources is frequency-division multiplexed (FDM) with other channels of the self-contained subframe.

Example 91

The method of example 83, in which the first one of the separate PUCCH resources is the final OFDM symbol in the self-contained subframe.

Example 92

The method of example 83, in which the first one of the separate PUCCH resources is multiple OFDM symbols including the final OFDM symbol in the self-contained subframe.

Example 93

An apparatus comprising means to perform one or more elements of a method described in or related to any of examples 47-92, and/or any other method or process described herein.

Example 94

One or more non-transitory (or transitory) computer-readable media comprising instructions to cause an electronic device, upon execution of the instructions by one or more processors of the electronic device, to perform one or more elements of a method described in or related to any of examples 47-92, and/or any other method or process described herein.

Example 95

An apparatus comprising control logic, transmit logic, and/or receive logic to perform one or more elements of a method described in or related to any of examples 47-92, and/or any other method or process described herein.

Example 96

A method of communicating in a wireless network as shown and described herein.

Example 97

A system for providing wireless communication as shown and described herein.

Example 98

A device for providing wireless communication as shown and described herein.

Skilled persons will understand that many changes may be made to the details of the above-described embodiments without departing from the underlying principles of the invention. The scope of the present invention should, therefore, be determined only by the following claims.

The invention claimed is:

1. A method, performed by a user equipment (UE), of transmitting a physical uplink control channel (PUCCH), the UE configured to employ the PUCCH in a self-contained data subframe including a physical downlink control channel (PDCCH), a data channel, a guard period adjacent the data channel, and the PUCCH, the method comprising:
   determining whether more than one orthogonal frequency-division multiplexed (OFDM) symbol is allocated for the PUCCH;
   in response to determining that more than one OFDM symbol is allocated for the PUCCH, deriving, based on an initial or a final OFDM symbol allocated for the PUCCH, a resource allocated for the PUCCH in an OFDM symbol other than the initial or the final OFDM symbol allocated for the PUCCH; and
   transmitting the PUCCH on the allocated resource.

2. The method of claim 1, further comprising applying frequency hopping for the resource allocation of the PUCCH in configured symbols.

3. The method of claim 2, further comprising applying the frequency hopping according to constant frequency offsets applied to the resource allocation of PUCCH in the configured symbols.

4. The method of claim 2, in which a physical resource block (PRB) index for the PUCCH in a kth symbol within a PUCCH region is derived according to $$I_{PRB}^{(k)}=(I_{PRB}^{(0)}+\Delta_{PRB})\mod(N_{RB}-N_{PRB}^{xPUCCH})$$

where $I_{PRB}^{(0)}$ is a physical resource block (PRB) index in the initial or the final OFDM symbol configured for the PUCCH; $N_{RB}$ is a number of PRBs available in UL system bandwidth; $N_{PRB}^{xPUCCH}$ is a number of PRBs for each PUCCH; and $\Delta_{PRB}$ is a hopping distance that is predefined or configured by higher layers in a cell-specific manner.

5. The method of claim 2, further comprising applying the frequency hopping according to a frequency hopping pattern initiated from the initial or the final OFDM symbol and defined as a function of physical cell identity (ID), virtual cell ID, and/or symbol index within a configured PUCCH region.

6. The method of claim 2, in which inter-symbol hopping is configured by higher-layer signaling.

7. The method of claim 2, in which inter-symbol hopping is enabled or disabled via explicit signaling in downlink control information (DCI) or radio resource control (RRC) signaling.

8. The method of claim 2, in which an inter-symbol hopping pattern of the PUCCH varies for different PUCCH resources configured by higher-layer signaling.

9. The method of claim 2, in which inter-symbol hopping is enabled for a first PUCCH resource while inter-symbol hopping is disabled for a second PUCCH resource.

10. A method, performed by a base station, of receiving a physical uplink control channel (PUCCH) from a user equipment (UE), the UE configured to employ the PUCCH in a self-contained data subframe including a physical downlink control channel (PDCCH), a data channel, a guard period adjacent the data channel, and the PUCCH, the method comprising:
    configuring an initial or a final orthogonal frequency-division multiplexed (OFDM) symbol allocated for the PUCCH to indicate that more than one OFDM symbol is allocated for the PUCCH;
    signaling the configuration the UE to cause it to derive, based on the initial or final OFDM symbol allocated for the PUCCH, a resource allocated for the PUCCH in an OFDM symbol other than the initial or the final OFDM symbol allocated for the PUCCH; and
    receiving the PUCCH on the allocated resource.

11. The method of claim 10, further comprising applying frequency hopping for the resource allocation of the PUCCH in configured symbols.

12. The method of claim 11, further comprising applying the frequency hopping according to constant frequency offsets applied to the resource allocation of the PUCCH in the configured symbols.

13. The method of claim 12, in which a physical resource block (PRB) index for the PUCCH in a kth symbol within a PUCCH region is derived according to $$I_{PRB}^{(k)}=(I_{PRB}^{(0)}+\Delta_{PRB})\mod(N_{RB}-N_{PRB}^{xPUCCH})$$

where $I_{PRB}^{(0)}$ is a physical resource block (PRB) index in the initial or the final OFDM symbol configured for the PUCCH; $N_{RB}$ is a number of PRBs available in UL system bandwidth; $N_{PRB}^{xPUCCH}$ is a number of PRBs for each PUCCH; and $\Delta_{PRB}$ is a hopping distance that is predefined or configured by higher layers in a cell-specific manner.

14. The method of claim 12, further comprising applying the frequency hopping according to a frequency hopping pattern initiated from the initial or the final OFDM symbol and defined as a function of physical cell identity (ID), virtual cell ID, and/or symbol index within a configured PUCCH region.

15. The method of claim 12, in which inter-symbol hopping is configured by higher-layer signaling.

16. The method of claim 12, in which inter-symbol hopping is enabled or disabled via explicit signaling in downlink control information (DCI) or radio resource control (RRC) signaling.

17. The method of claim 12, in which an inter-symbol hopping pattern of the PUCCH varies for different PUUCH resources configured by higher-layer signaling.

18. The method of claim 12, in which inter-symbol hopping is enabled for a first PUUCH resource while inter-symbol hopping is disabled for a second PUUCH resource.

* * * * *